A. F. TANNER.
FILTER FOR CYANIDING SYSTEMS.
APPLICATION FILED FEB. 10, 1915.
1,317,835.
Patented Oct. 7, 1919.
4 SHEETS—SHEET 1.
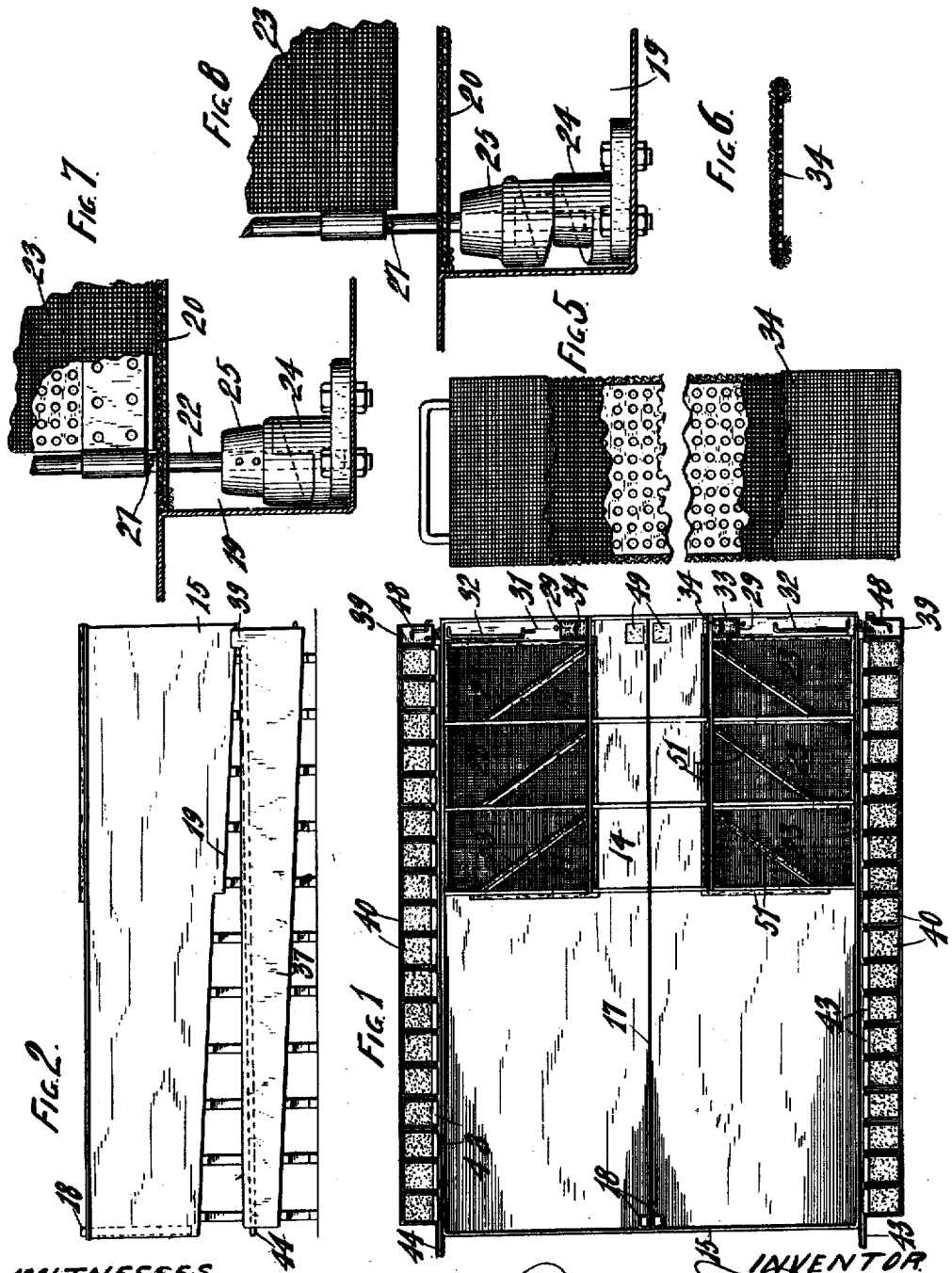

A. F. TANNER.
FILTER FOR CYANIDING SYSTEMS.
APPLICATION FILED FEB. 10, 1915.
1,317,835.
Patented Oct. 7, 1919.
4 SHEETS—SHEET 2.
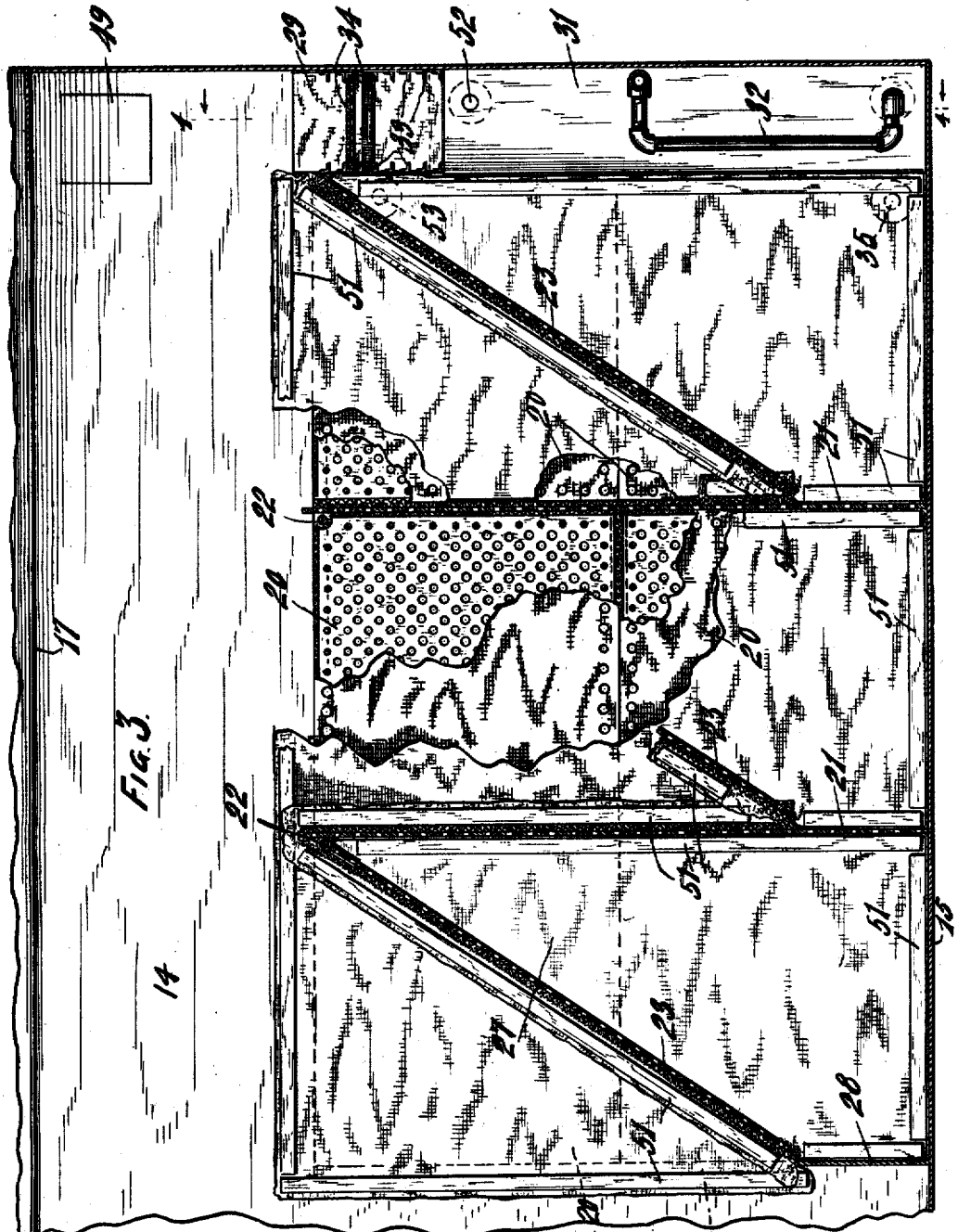

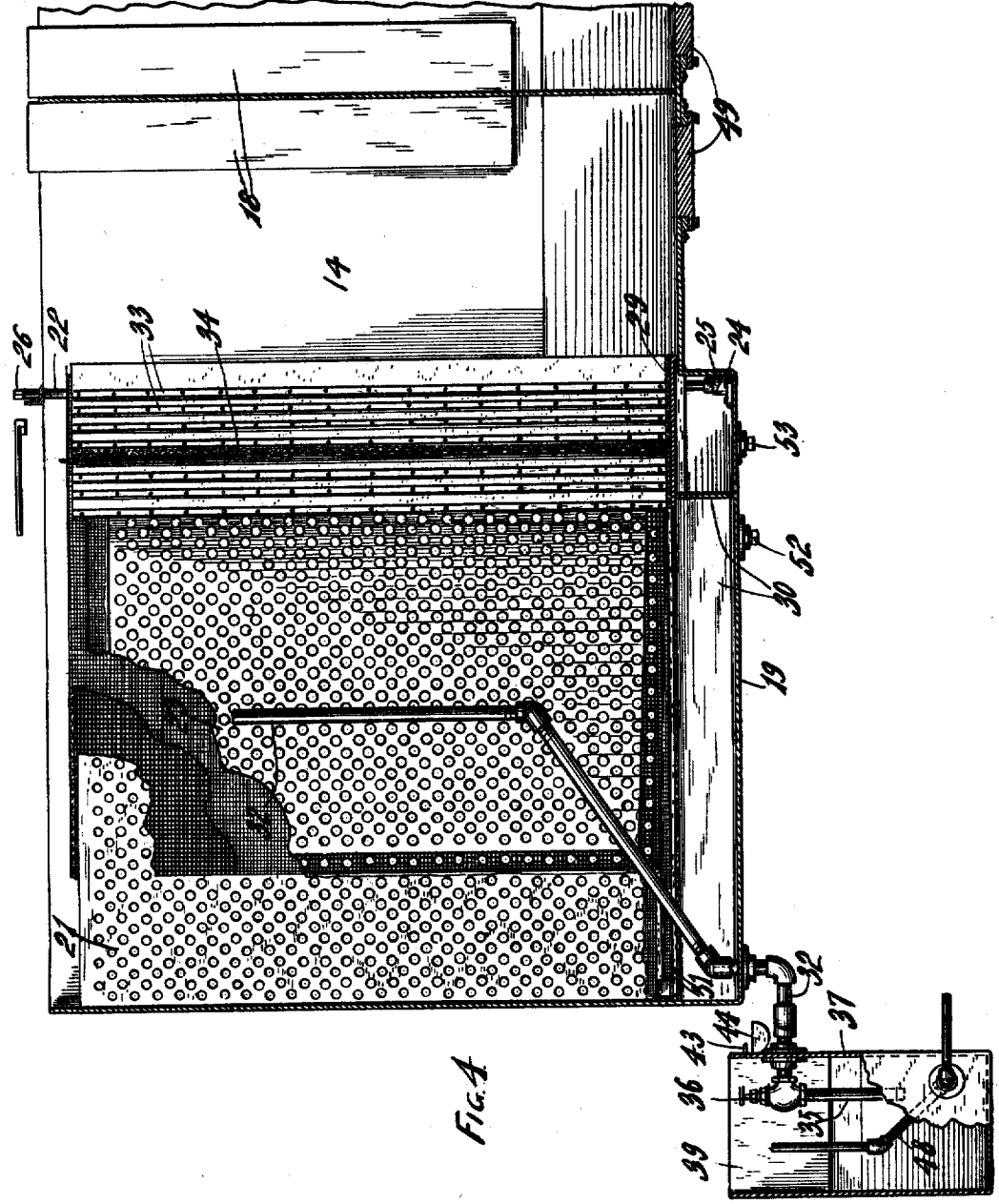

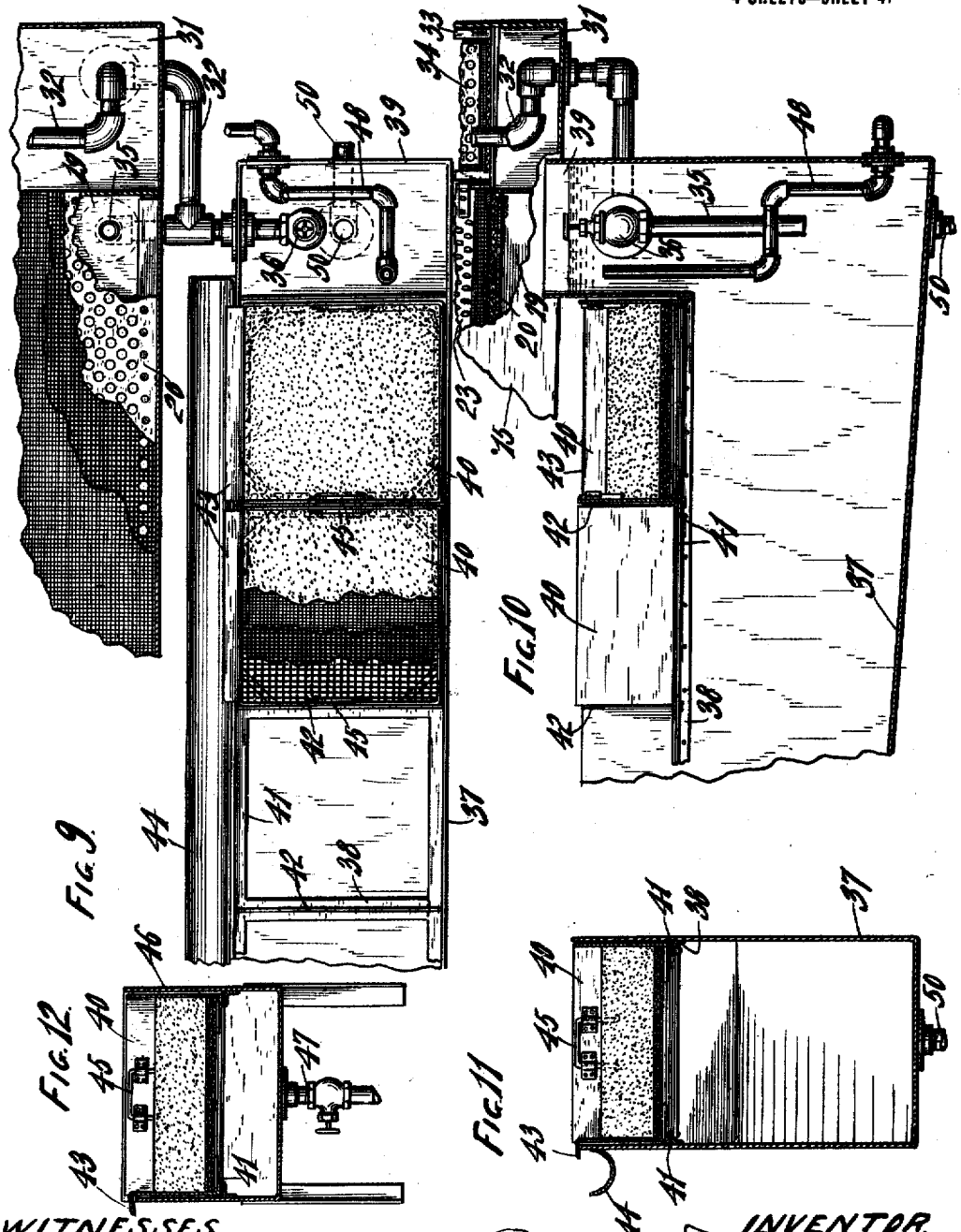

UNITED STATES PATENT OFFICE.

ALBERT F. TANNER, OF GREENFIELD, WISCONSIN, ASSIGNOR TO IDEAL CONTINUOUS CYANIDING PROCESS COMPANY, OF DAVENPORT, IOWA, A CORPORATION OF IOWA.

FILTER FOR CYANIDING SYSTEMS.

1,317,835. Specification of Letters Patent. Patented Oct. 7, 1919.

Application filed February 10, 1915. Serial No. 7,383.

*To all whom it may concern:*

Be it known that I, ALBERT F. TANNER, a citizen of the United States, and resident of the town of Greenfield, in the county of Milwaukee and State of Wisconsin, have invented new and useful Improvements in Filters for Cyaniding Systems, of which the following is a description, reference being had to the accompanying drawings, which are a part of this specification.

This invention has for its object to provide a filter for straining clear cyanid solution from the slimes in a cyaniding plant, in order that said clear solution may be suitably treated for recovering gold and silver, or other precious metal therefrom.

The invention is particularly designed as a part of the cyaniding system covered by my co-pending application for Letters Patent Serial No. 878,998, filed December 26, 1914, wherein a continuous treatment of ore pulp is provided for with a resulting continuous supply of spent cyanid solution requiring filtration on a large scale to separate the slimes before treatment for the recovery of the values contained, though it is not to be understood that the invention is confined in its use to such process, as it is suitable for use in any cyaniding process.

Another object of the invention is to provide a filter formed in sections capable of alternate use, and adapted for ready cleaning of the filter surfaces.

Another object of the invention is to provide such a filter with an overflow compartment into which the solution and slimes will flow when the main filter surfaces have become obstructed, and in which filtration will take place as the liquids pass therethrough.

Another object of the invention is to provide such overflow compartment with means for decantering clear solution therefrom.

Another object of the invention is to provide renewable filtering screens for draining the filter tank when the main filter surfaces have become obstructed, and thereby enabling the tank to be emptied and cleaned.

Another object of the invention is to provide a sand filter with a sand bed contained in removable baskets by means of which the solution from the filter tank may be further filtered by traveling upwardly therethrough, such baskets containing filtering sand being adapted to be readily cleaned.

With the above and other objects in view the invention consists in the filter for cyaniding systems as herein claimed, and all equivalents.

Referring to the accompanying drawings, in which like characters of reference indicate the same parts in the different views;

Figure 1 is a plan view of a filter for cyaniding systems constructed in accordance with this invention;

Fig. 2 is a side elevation thereof;

Fig. 3 is a sectional plan view through the filter screens of one of the duplicate sections of the filter tank;

Fig. 4 is a transverse sectional view therethrough on the plane of line 4—4 of Fig. 3;

Fig. 5 is a detail view of one of the removable filter plates;

Fig. 6 is a transverse sectional view thereof;

Fig. 7 is a detail view of one of the means for lifting the swinging filter screens with the filter screen in its lowered position;

Fig. 8 is a similar view thereof with the filter screen in its raised position;

Fig. 9 is a sectional plan view of one end of the sand filter and its connections with the filter tank;

Fig. 10 is a longitudinal sectional view of this end of the sand filter;

Fig. 11 is a transverse sectional view of the sand filter; and

Fig. 12 is a sectional view of the means for cleaning the sand baskets of the sand filter.

In these drawings 15 represents a filter tank which is preferably elevated on suitable supports and is provided with an inclined bottom as shown. The filter tank is preferably divided by a partition 17 so as to constitute two separate filtering tank sections each having a sufficient capacity for twenty-four hours use, so that one tank section may be available to receive the value bearing cyanid solution of the cyaniding plant, while the other is being drained and cleaned. The two filter tank sections are identical in construction so that a detailed description of one will serve for both. At the upper end of the filter tank section, close to the partition 17, is a launder or delivery spout 18 extending to near the bottom of the tank to deliver the value bearing cyanid solution to the filter tank just as it comes from the various parts of the cyaniding plant with the slimes and sand that are required to be removed before treatment to abstract the values held in the solution thereby.

At the outer lower corner of the filter tank section there is a rectangular depression 19 in the bottom of the tank covered by a false bottom of rectangular filter plates 20, consisting of perforated sheet metal plates covered with cocoa matting and filter fabric. This false bottom is substantially flush with the main bottom of the filter tank and forms with the depression 19 a compartment for filtered solution, there being an alleyway 14 between the partition 17 and the said compartment for filtering solution, along which the bottom of the tank is not depressed but remains the same as in the main portion of the tank.

Filter plates similar to filter plates 20 are arranged as fixed vertical partitions 21 and rest upon the false bottom. Other filter plates are pivotally mounted on vertical rods 22 to form swinging gates 23 extending obliquely across the filter compartments formed between the partitions 21, and the said rods 22 are located at the ends of the partitions 21 and are adapted to be raised or lowered to lift the filter gates 23 from contact with the false bottom when they are swung from one position to another and to lower them into contact with the false bottom in their operative positions. Each of the rods 22 is suitably mounted so as to be capable of turning, their lower ends fitting in step bearings 24 provided with a spiral cam surface upon which bears a similar spiral cam surface of a collar 25 fixed on the rod, while the upper end of the rod, as seen in Fig. 4, is provided with flat faces 26 to form a wrench hold adapting it for engagement by a wrench or crank for turning it and thereby causing the cam surfaces of the bearing 24 and collar 25 to raise or lower the rod and thereby raise or lower the filter gates 23, for the hinges of the latter rest on pins 27 projecting from the rod 22.

The arrangement of the partitions 21 and the hinged filter gates 23 is such that a continuous zig-zag filter wall is produced of considerable area and of a height somewhat less than the height of the walls of the filter tank, so that as the level of the liquid in the filter tank rises it will overflow into the filter chamber 27 behind the filter wall. Although the first filter gate 23 does not reach to the side wall of the filter tank, nor does the last filter gate 23 fit against the end of the filter tank, the filter chamber is nevertheless closed from communication with the main portion of the filter tank because of the presence of an imperforate wall 28 in the former location and a filter drain box 29 in the latter location. The wall 28 is in the form of a short partition corresponding with the partitions formed by the perforated filter plates 21 and engaged by the end of the first filter gate 23 in the same manner, leaving said filter gate free to swing away therefrom to a position against the first filter partition 21, when it is desired to clean the filter surfaces, the other filter gates being capable of being swung back in a like manner at such times to render all of the filter surface accessible for cleaning.

The false bottom terminates a short distance from the end wall of the filter tank, though the depressed portion of the bottom of the filter tank continues to the end, and end and side walls 30 convert this uncovered portion of the depressed bottom into a trough-like gutter 31 into which the filter drain box 29 discharges. The side and end walls 30 of the gutter 31 only extend up to the level of the false bottom of the filter compartment of which it forms a part. A decanter drain pipe 32 formed of sections pivotally connected together and passing through the bottom of the gutter 31 is adapted to be raised or lowered to have its open end positioned at any desired elevation from a position within the gutter and beneath the level of the false bottom to a position near the level of the upper edges of the filter plates forming the walls of the filter chamber. This decanter drain pipe is for the purpose of draining the partially clear solution from near the surface of the solution in the filter chamber after there has been an overflow of solution into the filter chamber as the result of the filter plates becoming clogged. The solution which overflows the filter plates is comparatively clear solution from the fact that it is taken from the top of the large body of solution contained in the main portion of the tank from which the slimes have had an opportunity to settle, and by decantering the solution from the top of the body of solution in the filter chamber, after giving opportunity for settlement of such slimes as may have been carried over therewith, the solution drawn off by the decanter pipe may be quite as free from slimes and sand, as that solution which has filtered through the filter plates into the filtered solution compartment beneath the false bottom.

In order that the body of solution contained in the main portion of the filter tank may be filtered as it is drained for emptying the tank, the filter drain box 29 is provided, which is best seen in Figs. 3 and 4, and consists of vertical side walls provided with a series of guide flanges 33 and a bottom wall, preferably covered with filter fabric, the guide flanges 33 being adapted to receive between them removable filter slides 34 which, as shown in Figs. 5 and 6, consist of perforated sheet metal plates covered with cocoa matting and filter cloth. During the filling of the tank one of these filter slides 34 is fitted in the filter drain box between the first set of guide flanges nearest the alleyway of the main portion of the tank, and as it is of substantially the same height as the walls of the filter chamber, the solution will filter therethrough and not overflow until the predetermined depth is reached, the said slide acting in precisely the same manner as the filter plates forming the walls of the filter chamber. When, however, it is desired to drain the solution from the tank after it has settled sufficiently to deposit most of the slimes and sand by gravity separation, the filter chamber 27 is first drained by the use of the decanter pipe 32, gradually lowering the open end thereof, as the surface of the solution is lowered, and then a clean slide 34 may be slipped into the next set of grooves between the guide flanges 33, and the first slide 34, which has become clogged during the filling of the tank, may be removed, and because of the clean filter surface of the substitute filter slide, there will be a considerable flow of solution therethrough into the gutter 31 from which it is drained through the folded decanter pipe 32. This substitution of fresh clean filter slides is continued from time to time until the filter tank is drained. The flow of filtered solution through the filter slides of the filter drain box 29 does not bring it in contact with the slime covered filter plates forming the bottom of the filter chamber, but is confined to the gutter 31, from which it is drawn by the decanter pipe 32.

A drain pipe 35 leads from the bottom of the tank at the corner of the filtered solution compartment beneath the false bottom and discharges through a valve 36 into the bottom of a sand filter trough 37, the decanter pipe 32 joining with said drain pipe 35 before reaching the valve.

The sand filter trough 37 is provided with an inclined bottom, and is preferably positioned alongside of the filter tank as shown, and mounted on the supports therewith. A rack 38 extends over the entire open upper part of the trough, except at the deeper end of the trough where the pipe 35 enters, and here the trough is provided with an upwardly extending portion 39 within which the solution may rise to a higher level than the sides of the trough proper so as to establish a pressure head sufficient to force the solution through the sand filters and over the rear edge of the trough which is slightly lower than the front edge, as seen in Fig. 11. The rack 38 forms a support for a series of sheet metal baskets 40 which are seated on packing strips 41 of felt or other suitable packing material with which the rack is covered, such tight fit of the filter baskets on the supporting rack 38 serving to prevent the solution passing around the baskets and requiring it to rise through the interior of the baskets which are partially filled with sand and have perforated bottoms covered with cocoa matting and filter fabric. The baskets fit between cross bars 42 which connect the upper edges of the trough, and form stays to prevent their spreading apart. The rear upper edge of each basket forms an outwardly extending lip 43, which bends over the lower rear edge of the trough 37 to discharge the solution into an inclined gutter 44 which carries it away for subsequent treatment to recover the value therefrom. Inasmuch as all of the solution passing through the filter baskets is conducted over the edge of the trough by means of the lips 43, the presence of liquid around the baskets would indicate an improper seating of one of the baskets so that the solution may be drained from the trough sufficiently to permit of correction being made at once in order that the filtering operation may be effective. With an imperfectly seated basket the pressure of the head of liquid in the trunk 39 would be ineffective for forcing the solution through the resistance of the filter bed as the space between the improperly seated basket and its support would offer less resistance to the flow of solution and the slimes would be carried through therewith and over the edge of the trough, and the filtering would not be properly done. The weight of the filter baskets and their contents serves to hold them firmly seated on the packing strips 41 of the supporting shoulders and the cross ribs and the presence of sand or any other material holding the baskets out of sealing connection will be indicated by the rising solution between the baskets. Each of the sand filter baskets 40 is provided with sliding bail handles 45 by means of which it may be lifted when it is desired to clean the filter material, which is done by merely placing the basket in a holder 46 in which the basket exactly fits, and then admitting water through a valved pipe 47 to the bottom of the holder so that the water flows upwardly through the basket with force, lifting the sand therewith and agitating it while flushing the slime and carrying it off in the overflow around the upper edges of the holder.

In order that the trough 37 may be drained of solution at the end of the filtering operation it is provided with a jointed decanter pipe 48 resembling the decanter pipe 32 in that it may be set at any desired elevation to take the solution from near the surface, the pipe being lowered as the level of the solution is lowered, thus permitting the slimes and sand to settle in the bottom of the trough, and enabling the solution to be drawn off in a clear state.

The filter fabrics are all removable for cleaning and for replacement when worn, and in order to seal the joints between meeting edges they are shown as having extending flaps held in place by metal rods 51 resting thereon, and the filter plates 20 which form the false bottom are removable for cleaning the depressed bottom portion 19 of the tank which is provided with a clean-out opening 52 at its lowered portion to facilitate such operation, the gutter 31 having a similar clean-out opening 53.

The operation of the filter has been described incidental to the description of the construction thereof, but briefly reviewed is as follows: The solution from the cyaniding plant is admitted through the launder 18 to the upper end of the tank 15 near the inclined bottom and flows to the filter chamber at the lower end of the tank where it percolates through such portions of the filter covered false bottom as are exposed outside of the zig-zag walls of the filter chamber, the clear, filtered solution passing into the depressed filter compartment beneath the false bottom and out through pipe 35 and open valve 36 to the sand filter trough 37 which is soon filled, and owing to the slight resistance offered by the sand filter baskets to the passage of the solution therethrough a liquid level will be established in the open trunk portion 39 of the trough slightly higher than the overflow lips 43 of the filter baskets. The pressure due to this head will cause the liquid to force its way slowly through the sand filter bed formed by the numerous sand baskets on the same level, and overflow over the lips 43 into the inclined gutter 44 by which it is carried off to be treated for the recovery of values therefrom. As the filter surface outside of the filter chamber becomes clogged by the deposit of slime thereon the level of the solution in the filter tank will rise, bringing more and more of the filter surface of the walls of said filter chamber into action, the clear solution passing through said walls into the filter chamber and then through the filter surface in the bottom of the filter chamber to the filter compartment beneath, and on through the sand filter as before. Eventually the depth of solution in the tank 15 becomes so great as to overflow the walls of the filter chamber owing to the clogging of the filter surface of said walls, but by this time the surface of the body of solution in the filter tank is comparatively clear owing to gravity separation of the slimes and sand, and such solution as overflows passes through the false bottom into the filtered solution compartment beneath and then through the sand filter. When the filter chamber becomes filled with solution and slime at the end of the twenty-four hour period the supply of solution to the tank is discontinued and shifted to the other tank where the process is repeated. Immediately, or preferably after a delay that will permit the slimes and sand to settle in the filter chamber and in the filter tank proper, the draining operation is begun by setting the decanter pipe 32 just below the level of the solution in the filter chamber, thus drawing off the clear solution from the top and conducting it to the sand filter, and gradually lowering the decanter pipe until it is within the gutter 31 beneath the level of the false bottom of the filter chamber. Now a clean filter slide 34 is slipped into place next to the filter slide that has been in position up to this time, the latter being then removed and permitting the solution within the tank to percolate through the filter surface of the clean filter slide, the filtered solution flowing out through the decanter pipe to the sand filter. Other filter slides are substituted in succession until the tank is emptied of solution and contains only the slimes and sand. The valve 36 is then closed and the tank is cleaned by scraping the slimes and sand from the walls thereof, and from all filter surfaces, and washing the latter with a hose, there being a clean-out opening 49 in the bottom of the tank at the lowest end of the alleyway through which the refuse matter is discharged. In order to facilitate the cleaning of the filter surfaces the filter gates 23 are first elevated by turning the rods 22 as described, and are then swung back against the filter partitions 21, thus rendering the entire false bottom available for cleaning, as well as the filter partitions 21, and the filter gates 23 which may have their filter surfaces scraped and scrubbed and flushed with a stream of water from a hose. The parts are then returned to their original positions and the filter section is again ready to receive a fresh supply of solution to relieve the other filter tank at the end of its period of operation.

The sand filters may be cleaned during the period of inactivity by draining the solution from the trough by means of the decanter pipe 48, and then placing each sand basket in the cleaner 46 and forcing a stream of water therethrough, as described, the sediment in the bottom of the trough 37 being removed through a clean-out pipe 50 in the bottom of the lower end thereof.

By means of the filter of this invention a large quantity of value bearing solution, as produced with a continuous cyaniding process, such as that described in my copending application referred to, may be thoroughly and effectively separated from the accompanying sand and slimes which would interfere with the action of the precipitation for recovering the values therefrom, and the supply of clean solution is maintained practically continuously because of the arrangement of filter surfaces, enabling one filter surface after another to be brought into action as the obstruction of filtering surfaces progresses and enabling the withdrawal of all of the cyanid solution so that practically no values are lost.

What I claim as new and desire to secure by Letters Patent is:

1. In a filter, a trough having an inclined bottom and an upwardly extending trunk projection at its end, means for supplying the trough with liquid, a rack within the trough, filter baskets fitting within the trough upon the rack and having a sealing connection therewith to seal the opening of the trough, a filter plate in the bottom of each of the filter baskets supporting sand within the filter basket to form a filter bed, lips projecting from the edges of the filter baskets over the edge of the trough, a gutter beneath the lips to catch the liquid falling therefrom, and a jointed decanter pipe at the lower end of the trough adapted to be moved into the trunk extension of the trough for draining the liquid from the trough.

2. In a filter, a trough having means for supplying liquid thereto, supporting shoulders along the side and end walls of the trough and spaced from the edges thereof, ribs extending across the trough, rectangular sand baskets seated on the supporting shoulders and the ribs, the adjacent baskets seated on the same rib whereby the opening of the trough is completely sealed by the sand baskets and the sand baskets are held in their sealing relation by means of their weight, and the weight of their contents, one edge of each basket being lower than the others and bent outwardly to form a lip extending over the edge of the trough whereby the liquid in the baskets is caused to rise higher than the edge of the trough and be conducted out of the trough without filling the space between the baskets.

In testimony whereof I affix my signature in presence of two witnesses.

ALBERT F. TANNER.

Witnesses:
R. S. C. CALDWELL,
KATHERINE HOLT.

Copies of this patent may be obtained for five cents each, by addressing the "Commissioner of Patents, Washington, D. C."